(12) United States Patent
Gordon Ford et al.

(10) Patent No.: US 8,281,394 B2
(45) Date of Patent: Oct. 2, 2012

(54) PHISHING NOTIFICATION SERVICE

(75) Inventors: Sarah Susan Gordon Ford, Satellite Beach, FL (US); Richard A. Ford, Satellite Beach, FL (US)

(73) Assignee: Symantec Corporation, Mountain View, CA (US)

( * ) Notice: Subject to any disclaimer, the term of this patent is extended or adjusted under 35 U.S.C. 154(b) by 887 days.

(21) Appl. No.: 11/849,093

(22) Filed: Aug. 31, 2007

(65) Prior Publication Data
US 2009/0064325 A1 Mar. 5, 2009

(51) Int. Cl.
*H04L 29/06* (2006.01)
(52) U.S. Cl. ............... 726/22; 726/23; 726/25; 726/26; 726/27
(58) Field of Classification Search ............ 726/22, 726/26
See application file for complete search history.

(56) References Cited

U.S. PATENT DOCUMENTS

| 7,854,006 | B1 | 12/2010 | Andruss et al. | |
|---|---|---|---|---|
| 2002/0052841 | A1* | 5/2002 | Guthrie et al. | 705/40 |
| 2004/0255159 | A1 | 12/2004 | Williamson et al. | |
| 2006/0090073 | A1* | 4/2006 | Steinberg et al. | 713/170 |
| 2006/0123478 | A1* | 6/2006 | Rehfuss et al. | 726/22 |
| 2007/0005984 | A1* | 1/2007 | Florencio et al. | 713/178 |
| 2007/0006305 | A1* | 1/2007 | Florencio et al. | 726/22 |
| 2007/0245032 | A1 | 10/2007 | KishorVarshney et al. | |
| 2010/0094839 | A1 | 4/2010 | Brach | |
| 2010/0175136 | A1* | 7/2010 | Frumer et al. | 726/26 |

OTHER PUBLICATIONS

Newstadt et al., "Personal Identifiable Information (PII) Theft Detection and Remediation System and Method", U.S. Appl. No. 12/324,174, filed Nov. 26, 2008.

\* cited by examiner

*Primary Examiner* — Brandon Hoffman
*Assistant Examiner* — Thomas C Lauzon
(74) *Attorney, Agent, or Firm* — McKay and Hodgson, LLP; Serge J. Hodgson; Sean P. Lewis

(57) ABSTRACT

A method includes determining whether new phishing site identifiers (URLs and/or IP addresses) have been created. Upon a determination that the new phishing site identifiers have been created, the new phishing site identifiers are compared to site identifiers of sites to which critical values have been provided in the past. Upon a determination that at least one of the new phishing site identifiers matches at least one of the site identifiers, a phishing notification is provided that the user was successfully phished in the past.

18 Claims, 3 Drawing Sheets

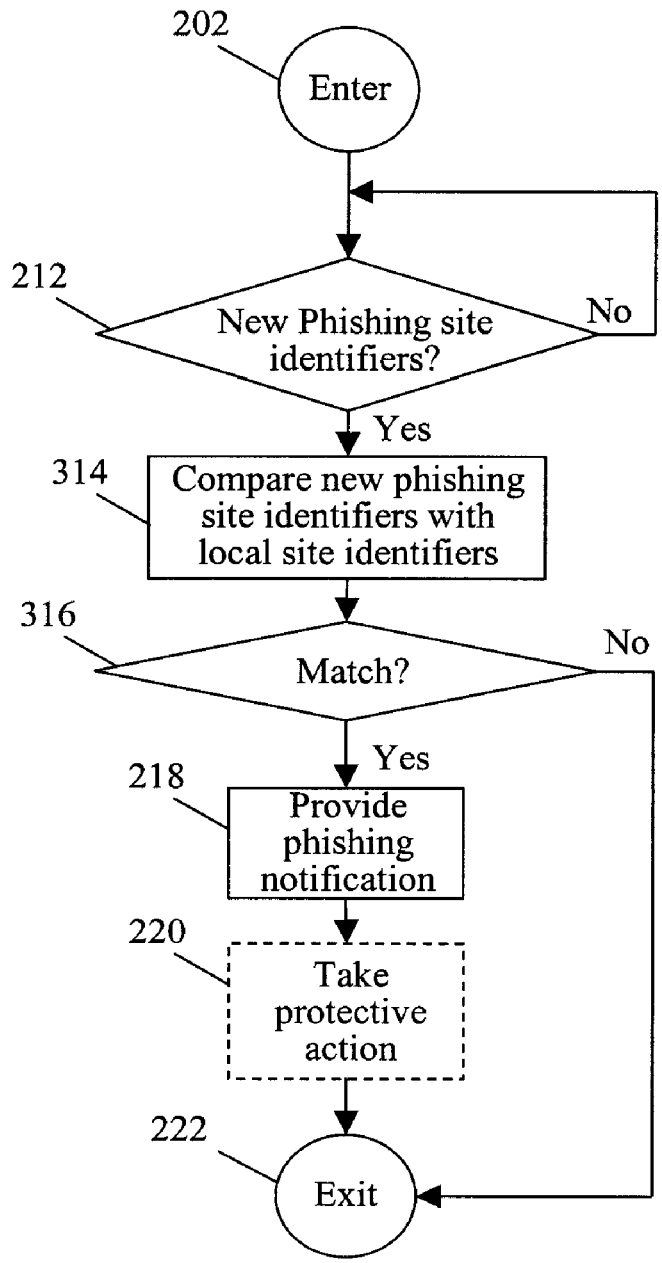

PHISHING NOTIFICATION SERVICE

BACKGROUND OF THE INVENTION

1. Field of the Invention

The present invention relates to the protection of computer system users. More particularly, the present invention relates to a method and apparatus for providing protection from phishing attacks.

2. Description of Related Art

Phishing is a term used to describe the actual or attempted theft of a user's private information. For example, an e-mail is sent to a user falsely claiming to be an established merchant in an attempt to trick the user into surrendering private information that will be used for identity theft. Typically, the e-mail directs the user to visit a web site, usually using a link provided in the e-mail itself, where the user is asked to update personal information, such as passwords, credit card numbers, social security numbers, and/or bank account numbers, that the legitimate merchant already has. The Web site, however, is not the actual legitimate site; it is actually a look-a-like site, is malicious, and is set up only to steal the user's information.

Although one example of a phishing attack is described above, there are many types of phishing attacks.

To protect users from phishing attacks, security applications such as anti-phishing applications have been developed. These security applications take protective actions when a user attempts to visit a known phishing site, e.g., a website. For example, the security applications block access to the phishing site, or at least provide a notification that the user is connecting with a known phishing site.

Security applications rely upon updates from security vendor update sites. These updates are an important component of the security applications. For example, as new phishing sites are discovered, new phishing Uniform Resource Locators (URLs) are distributed as an update to allow for the security applications to protect users from the newly discovered phishing site.

However, by the time phishing sites are discovered by security vendors, a user's private information may already have been stolen, often without the user even being aware that they were subject to a successful phishing attack. Often, the user doesn't become aware that they were subject to a successful phishing attack until the user becomes a victim of identity theft.

SUMMARY OF THE INVENTION

In accordance with one embodiment, a method includes determining whether new phishing site identifiers (such as, but not limited to, URLs and/or IP addresses) have been created. Upon a determination that the new phishing site identifiers have been created, the new phishing site identifiers are compared to site identifiers of sites to which critical values (such as personal/confidential information of the user) have been provided in the past. Upon a determination that at least one of the new phishing site identifiers matches at least one of the site identifiers, a phishing notification is provided that the user was successfully phished in the past.

In this manner, the user is not only presently protected from the phishing site, but is also notified by the phishing notification if the user had been the victim of a successful phishing attack in the past. Further, the phishing notification contains sufficient information for the user to take proactive steps to reduce the consequences of the attack, such as contacting the user's credit bureau, to prevent or minimize any identity theft associated with the successful phishing attack.

Embodiments in accordance with the present invention are best understood by reference to the following detailed description when read in conjunction with the accompanying drawings.

BRIEF DESCRIPTION OF THE DRAWINGS

FIGS. 2 and 3 are flow diagrams of phishing notification processes in accordance with various embodiments.

Common reference numerals are used throughout the drawings and detailed description to indicate like elements.

DETAILED DESCRIPTION

Figure 2:
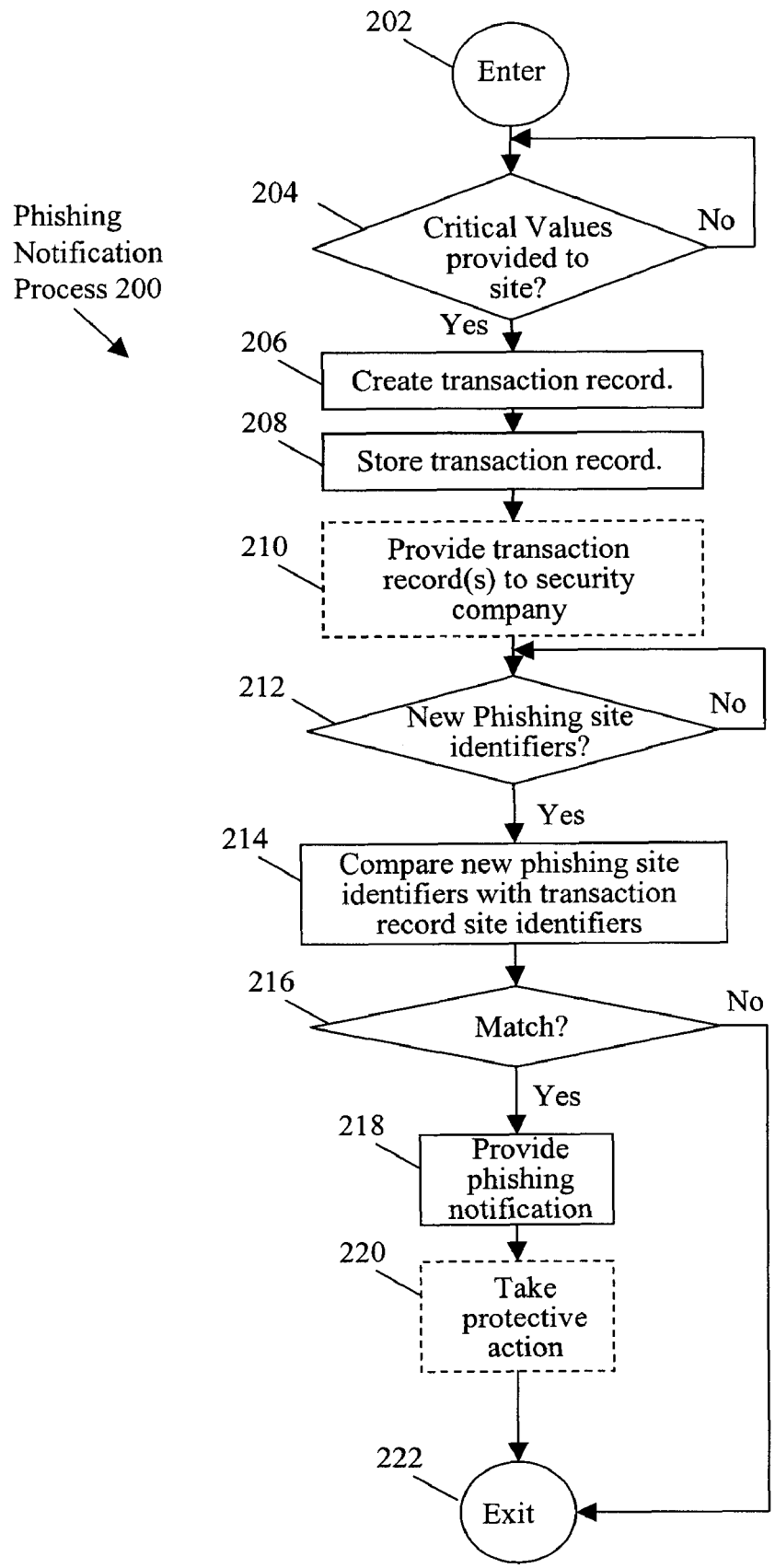

Referring to FIG. 2, a phishing notification process 200 includes determining whether new phishing site identifiers (such as, but not limited to, URLs and/or IP addresses) have been created (OPERATION 212). Upon a determination that the new phishing site identifiers have been created, the new phishing site identifiers are compared to site identifiers of sites to which critical values (such as personal/confidential information of the user) have been provided in the past (OPERATION 214). Upon a determination that at least one of the new phishing site identifiers matches at least one of the site identifiers (yes in OPERATION 216), a phishing notification is provided that the user was successfully phished in the past (OPERATION 218).

In this manner, the user is not only presently protected from the phishing site, but is also notified by the phishing notification if the user had been the victim of a successful phishing attack in the past. Further, the phishing notification contains sufficient information for the user to take proactive steps to reduce the consequences of the attack, such as contacting the user's credit bureau, to prevent or minimize any identity theft associated with the successful phishing attack.

Figure 1:
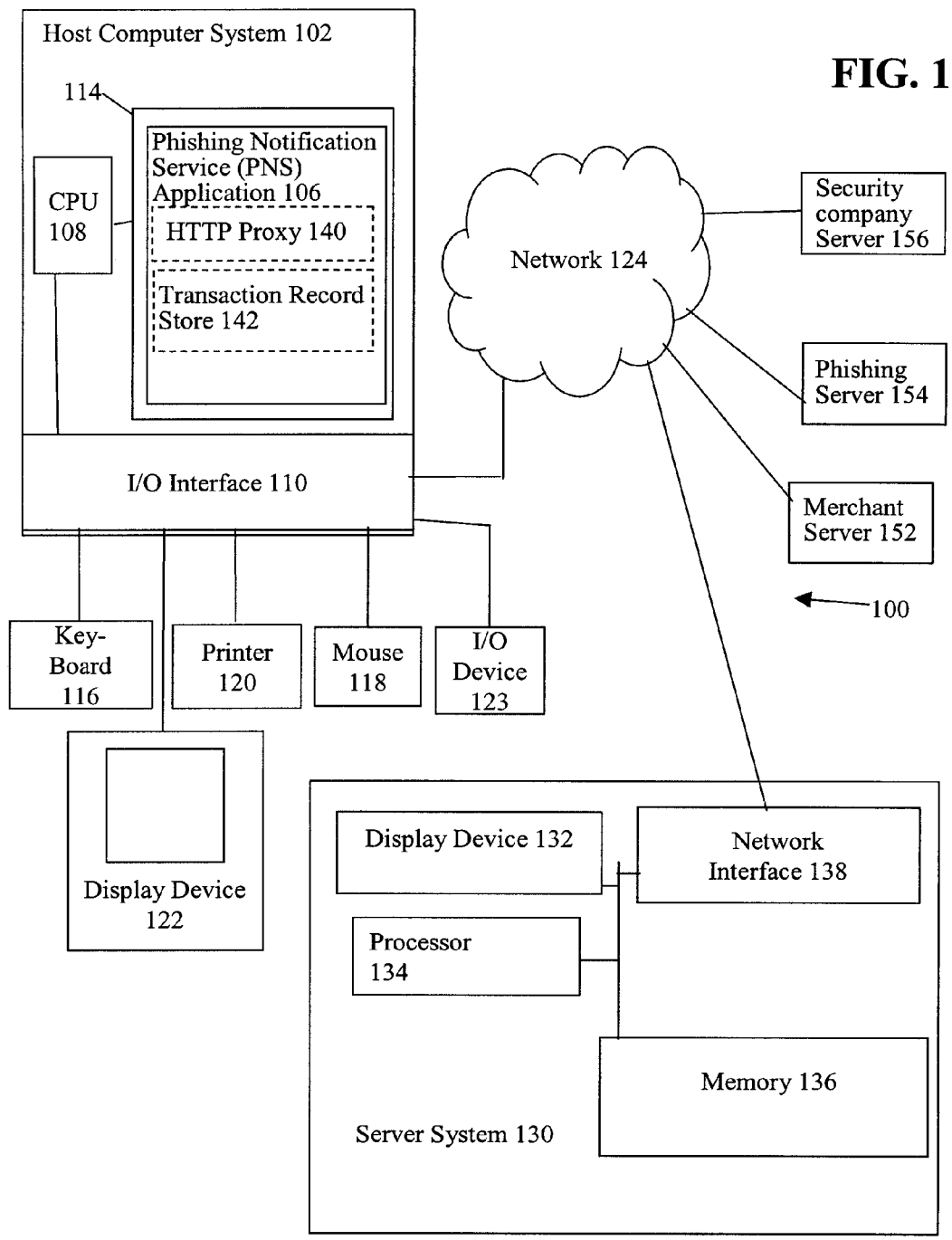
FIG. 1 is a diagram of a client-server system that includes a Phishing Notification Service (PNS) application executing on a host computer system in accordance with one embodiment.

More particularly, FIG. 1 is a diagram of a client-server system 100 that includes a Phishing Notification Service (PNS) application 106 executing on a host computer system 102, e.g., a first computer system, in accordance with one embodiment.

Host computer system 102, sometimes called a client or user device, typically includes a central processing unit (CPU) 108, hereinafter processor 108, an input output (I/O) interface 110, and a memory 114.

Phishing Notification Service (PNS) application 106 includes, optionally, a HyperText Transfer Protocol (HTTP) proxy 140 and a transaction record store 142. HTTP proxies are well known to those of skill in the art. Generally, HTTP proxy 140 sits between user applications of host computer system 102, e.g., a Web browser of host computer system 102, and network 124. HTTP traffic of user applications of host computer system 102 pass through HTTP proxy 140.

Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, Phishing Notification Service (PNS) application 106 is loaded into host computer system 102 via I/O device 123, such as from a CD, DVD or floppy disk containing Phishing Notification Service (PNS) application 106.

Host computer system 102 is coupled to a server computer system 130 of client-server system 100 by network 124. Server computer system 130 typically includes a display device 132, a processor 134, a memory 136, and a network interface 138.

Further, host computer system 102 is also coupled to a merchant server 152, a phishing server 154, and a security company server 156 by network 124. In one embodiment, merchant server 152, phishing server 154, and security company server 156 are similar to host computer system 102 and/or server computer system 130, for example, include a central processing unit, an input output (I/O) interface, and a memory.

Merchant server 152, phishing server 154, and security company server 156 may further include standard devices like a keyboard, a mouse, a printer, a display device and an I/O device(s). The various hardware components of merchant server 152, phishing server 154, and security company server 156 are not illustrated to avoid detracting from the principles of this embodiment.

Network 124 can be any network or network system that is of interest to a user. In various embodiments, network interface 138 and I/O interface 110 include analog modems, digital modems, or a network interface card.

Phishing Notification Service (PNS) application 106 is stored in memory 114 of host computer system 102 and executed on host computer system 102. The particular type of and configuration of host computer system 102, merchant server 152, phishing server 154, security company server 156, and server computer system 130 are not essential to this embodiment.

FIG. 2 is a flow diagram of a phishing notification process 200 in accordance with one embodiment. Referring now to FIGS. 1 and 2 together, execution of Phishing Notification Service (PNS) application 106 by processor 108 results in the operations of phishing notification process 200 as described below in one embodiment.

From an ENTER OPERATION 202, flow moves to a CRITICAL VALUES PROVIDED TO SITE CHECK OPERATION 204. In CRITICAL VALUES PROVIDED TO SITE CHECK OPERATION 204, a determination is made as to whether critical values, e.g., at least one critical value, have been provided to a site, e.g., a website.

If critical values have not been provided to a site, flow remains at CRITICAL VALUES PROVIDED TO SITE CHECK OPERATION 204. Conversely, if critical values have been provided to a site, flow moves to a CREATE TRANSACTION RECORD OPERATION 206.

In one embodiment, critical values, sometimes called parameters, are values such as personal/confidential information of the user that are critical to a successful phishing attack. Some examples of critical values include the user's name, account numbers, passwords, credit card numbers, social security number, and bank account numbers. Illustratively, which values are critical values is configurable, e.g., by the user or system administrator of host computer system 102, or by the security company.

To illustrate, the user of host computer system 102 receives an e-mail falsely claiming to be an established merchant. The e-mail includes a link that falsely claims to direct the user to visit a web site associated with the merchant, e.g., to connect to merchant server 152. However, upon clicking the e-mail link, the user is unknowingly connected to phishing server 154, which hosts a phishing web site that is essentially a facsimile (a close copy) of the web site hosted by legitimate merchant server 152. The user provides private information, e.g., critical values, to the phishing web site hosted by phishing server 154 believing that the private information is being provided to merchant server 152.

In one embodiment, the phishing web site hosted by phishing server 154 is not a known phishing site, e.g., has not been identified as a phishing site by a security company. Accordingly, even if a security application including an anti-phishing application is executing on host computer system 102, the user is allowed to provide critical values to the phishing web site hosted by phishing server 154, as the phishing web site hosted by phishing server 154 has not been identified as a known phishing site by the anti-phishing application.

In this example, the user is tricked into surrendering private information that may be used for identity theft. Moreover, the user has surrendered the private information without even being aware that they have done so.

In one embodiment, the act of providing critical values to a site is referred to as a transaction. A transaction is not limited to a financial transaction, e.g., transferring of money or purchasing a product, but includes any transmission of critical values. Transactions can be monitored using HTTP proxy 140.

Although one example of a phishing attack is described above, there are many types of phishing attacks and the particular phishing attack is not essential to this embodiment.

Accordingly, if critical values have been provided to a site, flow moves to CREATE TRANSACTION RECORD OPERATION 206. In CREATE TRANSACTION RECORD OPERATION 206, a transaction record is created for the transaction. A transaction record includes a site identifier, e.g., a complete Uniform Resource Locator (URL), a sub URL, and/or Internet Protocol (IP) address, of the site to which critical values were provided. Although URL and/or IP addresses are set forth herein as examples of site identifiers, in light of this disclosure, those of skill in the art will understand that a variety of site identifiers can be used to identify a site. Accordingly, site identifiers include, but are not limited to, URLs and IP addresses.

An IP address is an identifier for a computer or device on a TCP/IP (Transmission Control Protocol/Internet Protocol) network. Networks using the TCP/IP protocol route messages based on the IP address of the destination. The format of an IP address in IPV4 is typically a 32-bit numeric address written as four numbers separated by periods. For example, 127.0.0.1 could be an IP address.

However, IP addresses are difficult for humans to remember. Thus, for the convenience of humans, host (machine) names and domain names are commonly used instead of IP addresses.

A host/domain name is a name that identifies one or more IP addresses. Because Internet traffic is routed using IP addresses, not host/domain names, every Web Server requires a DNS (domain name system) server to translate host/domain names into IP addresses.

More particularly, the host computer generates a DNS query to a DNS server to translate the host/domain name into the IP address. The response to the DNS query, if successfully resolved, returns the IP address of the host site associated with the host/domain name.

Accordingly, a site, e.g. a website, can be identified by a URL (including a sub URL), and/or IP address. Thus, a URL and/or IP address is a site identifier for a site. Although site identifiers as URLs and/or IP addresses are set forth herein, it is to be understood that the URLs and/or IP addresses are for computer systems that host the site. As set forth above, site identifiers include, but are not limited to, URLs and/or IP addresses.

In one embodiment, the transaction record also includes one or more of the following: (1) the critical values provided, e.g., the actual values such as an actual bank account number; (2) the type of critical values provided, e.g., that a bank account number was provided without specifying the actual bank account number; (3) the date when the critical values were provided; and (4) the time when the critical values were provided.

From CREATE TRANSACTION RECORD OPERATION 206, flow moves to a STORE TRANSACTION RECORD OPERATION 208. In STORE TRANSACTION RECORD OPERATION 208, the transaction record created in CREATE TRANSACTION RECORD OPERATION 206 is stored. Illustratively, the transaction record is stored in transaction record store 142. In one embodiment, transaction record store 142 includes a plurality of stored transaction records.

In another embodiment, the transaction record is provided to a security company in a manner similar to that discussed below regarding a PROVIDE TRANSACTION RECORD(S) TO SECURITY COMPANY OPERATION 210. In accordance with this embodiment, the transaction record is stored by the security company, e.g., on security company server 156.

From STORE TRANSACTION RECORD OPERATION 208, flow moves, optionally, to a PROVIDE TRANSACTION RECORD(S) TO SECURITY COMPANY OPERATION 210 (or directly to a NEW PHISHING SITE IDENTIFIERS CHECK OPERATION 212 in the event that OPERATION 210 is not performed). In PROVIDE TRANSACTION RECORD(S) TO SECURITY COMPANY OPERATION 210, the transaction records stored on host computer system 102, e.g., at least one transaction record, are provided to a security company. Illustratively, the transaction records are provided to security company server 156 using a secure/encrypted transmission of the transaction records.

In one embodiment, each transaction record is provided immediately upon creation to the security company. In another embodiment, the transaction records are provided to the security company periodically, e.g., hourly, daily, or weekly. Illustratively, the period in which the transaction records are provided to the security company is configurable, e.g., by the user or system administrator of host computer system 102, or by the security vendor.

From PROVIDE TRANSACTION RECORD(S) TO SECURITY COMPANY OPERATION 210, flow moves to NEW PHISHING SITE IDENTIFIERS CHECK OPERATION 212. In NEW PHISHING SITE IDENTIFIERS CHECK OPERATION 212, a determination is made as to whether new phishing site identifiers have been created.

If new phishing site identifiers have not been created, flow remains at NEW PHISHING SITE IDENTIFIERS CHECK OPERATION 212. Conversely, if new phishing site identifiers have been created, flow moves to a COMPARE NEW PHISHING SITE IDENTIFIERS WITH TRANSACTION RECORD SITE IDENTIFIERS OPERATION 214.

In one embodiment, a new phishing site identifier is a URL and/or IP address, sometimes called a site identifier, of a newly discovered phishing site. A phishing site is a site, e.g., a web site, that is known to maliciously collect private information, e.g., for use in identity theft. The particular technique used to discover a phishing site is not essential to this embodiment, and any one of a number of known techniques can be used. Generally, a URL, an IP address and/or other identifier of a web site that was previously not a known phishing site but is now identified as a phishing site is a new phishing site identifier.

In one embodiment, the security company develops the new phishing site identifiers. Accordingly, once developed, a determination is made at the security company that there are new phishing site identifiers in NEW PHISHING SITE IDENTIFIERS CHECK OPERATION 212.

In another embodiment, new phishing site identifiers are downloaded to host computer system 102, e.g., from security company server 156. Illustratively, Phishing Notification Service (PNS) application 106, e.g., part of a comprehensive security application of host computer system 102, receives periodic updates from security company server 156, e.g., using Symantec Corporation's LIVEUPDATE™ system that automatically downloads updates including new phishing site identifiers. Accordingly, upon receiving the new phishing site identifiers, a determination is made that there are new phishing site identifiers in NEW PHISHING SITE IDENTIFIERS CHECK OPERATION 212.

As the phishing site has only been newly discovered, a user may have visited the phishing site and provided critical values as part of a successful phishing attack in the past unknown to the user as discussed above. Accordingly, upon a determination that there are new phishing site identifiers, the new phishing site identifiers are compared with the site identifiers contained within the stored transaction records in COMPARE NEW PHISHING SITE IDENTIFIERS WITH TRANSACTION RECORD SITE IDENTIFIERS OPERATION 214.

From COMPARE NEW PHISHING SITE IDENTIFIERS WITH TRANSACTION RECORD SITE IDENTIFIERS OPERATION 214, flow moves to a MATCH CHECK OPERATION 216. In MATCH CHECK OPERATION 216, a determination is made as to whether any of the new phishing site identifiers match any of the site identifiers contained within the stored transaction records. Stated another way, a determination is made as to whether at least one of the new phishing site identifiers matches at least one of the site identifiers contained within the stored transaction records. If there is a match, flow moves to a PROVIDE PHISHING NOTIFICATION OPERATION 218. Conversely, if there is not a match, flow moves to and exits at an EXIT OPERATION 222 or returns to CHECK OPERATION 204 and waits for more critical values to be provided to a site.

More particularly, if there is not a match, the user of host computer system 102 did not provide critical values to a site in the past which has recently been discovered to be a phishing site. Accordingly, no further action is taken and flow exits at EXIT OPERATION 222 as discussed above.

However, if there is a match, the user of host computer system 102 did provide critical values in the past to a now known phishing site, i.e., the user provided critical values previously to a phishing site that was not a known phishing site at the time the critical values were provided. Accordingly, flow moves from MATCH CHECK OPERATION 216 to PROVIDE PHISHING NOTIFICATION OPERATION 218.

In PROVIDE PHISHING NOTIFICATION OPERATION 218, a phishing notification is provided that the user was successfully phished in the past, i.e., provided critical values to a known phishing site. Illustratively, the phishing notification includes one or more of the following notifications: (1) the date and/or time when the critical values were provided to the phishing site; (2) the critical values provided to the phishing site; (3) the site identifier, e.g., the URL and/or IP address, of the phishing site; (4) the name of the phishing site; and (5) the legitimate merchant that was impersonated, sometimes called copied, by the phishing site.

In one embodiment, the notification appears as the following message:
Be advised that you were successfully phished on <date>, via <URL> location, in an attempt to do business with <merchant site>, you actually connected to <phishing site>. You are advised to contact <merchant> and your credit bureau to protect yourself from identity theft.

To continue with the above example, take the case where the user was tricked into surrendering private information without even being aware that they had done so. Upon the site being discovered, new phishing URLs are distributed to allow for the security applications to protect users from the newly discovered phishing site. More particularly, using the new phishing URLs, protective action will be taken if the user attempts to have a transaction with a phishing site associated with the phishing URLs.

Further, in accordance with this embodiment, a determination will be made in NEW PHISHING SITE IDENTIFIERS CHECK OPERATION 212 that there are new phishing site identifiers upon distribution of the new phishing URLs. The new phishing URLs are compared with site identifiers of the stored transaction records in COMPARE NEW PHISHING SITE IDENTIFIERS WITH TRANSACTION RECORD SITE IDENTIFIERS OPERATION 214. Upon determining that there is a match between the new phishing URLs and the site identifiers of the stored transaction records in MATCH CHECK OPERATION 216, a phishing notification is provided in PROVIDE PHISHING NOTIFICATION OPERATION 218.

In this manner, the user of host computer system 102 is not only presently protected from the phishing sites, but is also notified by the phishing notification if the user had been the victim of a successful phishing attack in the past. Further, the phishing notification contains sufficient information for the user to take proactive steps to reduce the consequences of the attack, such as contacting the user's credit bureau, to prevent or minimize any identity theft associated with the successful phishing attack.

In one embodiment, OPERATIONS 214, 216 are performed at the security company. Accordingly, in PROVIDE PHISHING NOTIFICATION OPERATION 218, the phishing notification is transmitted from the security company to host computer system 102, e.g., as an e-mail or otherwise.

In another embodiment, OPERATIONS 214, 216 are performed on host computer system 102, e.g., upon receiving new phishing site identifiers as discussed above. In accordance with this embodiment, the phishing notification is provided by phishing notification service (PNS) application 106 to the user of host computer system 102, e.g., as a pop-up window on display device 122, to a system administrator, logged to a file, or otherwise.

In other examples, the phishing notification is provided to interested third parties. For example, the phishing notification is provided to the merchant impersonated by the phishing site, a credit bureau, or a law enforcement agency. In accordance with this example, the phishing notification is provided without any private user information thus protecting the user's confidential information. This information is used for mapping successful phishing attacks including the types of phishing attacks being successfully used.

From PROVIDE PHISHING NOTIFICATION OPERATION 218, flow moves, optionally, to a TAKE PROTECTIVE ACTION OPERATION 220 (or directly to EXIT OPERATION 222). In TAKE PROTECTIVE ACTION OPERATION 220, protective action is taken to provide protection from the newly discovered phishing site. Illustratively, any phishing e-mail associated with the phishing site is deleted from host computer system 102, quarantined, or otherwise disabled.

From TAKE PROTECTIVE ACTION OPERATION 220, flow moves to and exits at EXIT OPERATION 222 or returns to CRITICAL VALUES PROVIDED TO SITE CHECK OPERATION 204 as discussed above.

FIG. 3 is a flow diagram of a phishing notification process 300 in accordance with another embodiment. Referring now to FIGS. 1, 2 and 3 together, execution of Phishing Notification Service (PNS) application 106 by processor 108 results in the operations of phishing notification process 300 as described below in one embodiment.

ENTER OPERATION 202, NEW PHISHING SITE IDENTIFIERS CHECK OPERATION 212, PROVIDE PHISHING NOTIFICATION OPERATION 218, TAKE PROTECTIVE ACTION OPERATION 220, and EXIT OPERATION 222 of phishing notification process 300 of FIG. 3 are similar or identical to ENTER OPERATION 202, NEW PHISHING SITE IDENTIFIERS CHECK OPERATION 212, PROVIDE PHISHING NOTIFICATION OPERATION 218, TAKE PROTECTIVE ACTION OPERATION 220, and EXIT OPERATION 222 of phishing notification process 200 of FIG. 2 and so are not discussed in detail below.

From ENTER OPERATION 202, flow moves to NEW PHISHING SITE IDENTIFIERS CHECK OPERATION 212. Upon a determination that there are new phishing site identifiers, flow moves from NEW PHISHING SITE IDENTIFIERS CHECK OPERATION 212 to a COMPARE NEW PHISHING SITE IDENTIFIERS WITH LOCAL SITE IDENTIFIERS OPERATION 314. In COMPARE NEW PHISHING SITE IDENTIFIERS WITH LOCAL SITE IDENTIFIERS OPERATION 314, the new phishing site identifiers are compared with local site identifiers of host computer system 102.

In one embodiment, the local site identifiers include URLs and/or IP addresses from the cache (memory) of the Web browser of host computer system 102. In another embodiment, the local site identifiers include URLs and/or IP addresses from e-mails stored on host computer system 102. Generally, the local site identifiers of host computer system 102 include URLs, IP addresses, and/or other site identifiers on host computer system 102.

From COMPARE NEW PHISHING SITE IDENTIFIERS WITH LOCAL SITE IDENTIFIERS OPERATION 314, flow moves to a MATCH CHECK OPERATION 316. In MATCH CHECK OPERATION 316, a determination is made as to whether any of the new phishing site identifiers match any of the local site identifiers. If there is a match, flow moves to PROVIDE PHISHING NOTIFICATION OPERATION 218, which is performed as discussed above. Conversely, if there is not a match, flow moves to and exits at EXIT OPERATION 222 or returns to NEW PHISHING SITE IDENTIFIERS CHECK OPERATION 212 and waits for new phishing site identifiers.

Referring again to FIG. 1, Phishing Notification Service (PNS) application 106 is in computer memory 114. As used herein, a computer memory refers to a volatile memory, a non-volatile memory, or a combination of the two.

Although Phishing Notification Service (PNS) application 106 are referred to as an application, this is illustrative only. Phishing Notification Service (PNS) application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments have been described for a client-server configuration, an embodiment may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment. Some examples of computer program products are CD-ROM discs (CDs), DVDs, ROM cards, floppy discs, magnetic tapes, computer hard drives, servers on a network and signals transmitted over a network representing computer readable code. In another embodiment, a computer program product comprises a tangible medium configured to store computer readable code including CD-ROM discs, DVDs, ROM cards, floppy discs, magnetic tapes, computer hard drives and servers on a network.

As illustrated in FIG. 1, this medium may belong to the computer system itself. However, the medium also may be removed from the computer system. For example, Phishing Notification Service (PNS) application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the Phishing Notification Service functionality in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the Phishing Notification Service functionality in accordance with one embodiment can be implemented in a wide variety of computer system configurations. In addition, the Phishing Notification Service functionality could be stored as different modules in memories of different devices. For example, Phishing Notification Service (PNS) application 106 could initially be stored in server computer system 130, and then as necessary, a portion of Phishing Notification Service (PNS) application 106 could be transferred to host computer system 102 and executed on host computer system 102. Consequently, part of the Phishing Notification Service functionality would be executed on processor 134 of server computer system 130, and another part would be executed on processor 108 of host computer system 102. In view of this disclosure, those of skill in the art can implement various embodiments in a wide-variety of physical hardware configurations using an operating system and computer programming language of interest to the user.

In yet another embodiment, Phishing Notification Service (PNS) application 106 is stored in memory 136 of server computer system 130. Phishing Notification Service (PNS) application 106 is transferred over network 124 to memory 114 in host computer system 102. In this embodiment, network interface 138 and I/O interface 110 would include analog modems, digital modems, or a network interface card. If modems are used, network 124 includes a communications network, and Phishing Notification Service (PNS) application 106 is downloaded via the communications network.

This disclosure provides exemplary embodiments. The scope is not limited by these exemplary embodiments. Numerous variations, whether explicitly provided for by the specification or implied by the specification or not, may be implemented by one of skill in the art in view of this disclosure.

What is claimed is:

1. A method comprising:
   determining, during a transaction with a website, that one or more critical values were provided to the website;
   storing the one or more critical values and other transaction information in a log of transaction activities, the transaction information at least including a site identifier for each website to which one or more critical values have been provided;
   determining whether new phishing site identifiers have been created, wherein upon a determination that said new phishing site identifiers have been created, said method further comprising:
   comparing said new phishing site identifiers to site identifiers of logged sites to which critical values have previously been provided, wherein upon a determination that at least one of said new phishing site identifiers matches at least one of said site identifiers, said method further comprising:
   providing, using information from the log of transaction activities, a phishing notification to a user that provided the critical values to the site, the phishing notification comprising the date and/or time when the critical values were provided to the phishing site, and the actual critical values previously provided to the phishing site, the information from the log of transaction activities at least including the actual values; and
   providing a phishing notification to at least one of a merchant impersonated by the phishing site, a credit bureau, or a law enforcement agency, the phishing notification comprising the date and/or time when the critical values were provided to the phishing site.

2. The method of claim 1 wherein said new phishing site identifiers are site identifiers of newly discovered phishing sites.

3. The method of claim 2 wherein said new phishing site identifiers comprise Uniform Resource Locators (URLs) of said newly discovered phishing sites.

4. The method of claim 2 wherein said new phishing site identifiers comprise Internet Protocol (IP) addresses of said newly discovered phishing sites.

5. The method of claim 1 wherein upon a determination that at least one of said new phishing site identifiers does not match at least one of said site identifiers, a determination is made that critical values have not been provided to a site which has been discovered to be a phishing site.

6. The method of claim 1 wherein said phishing notification further comprises notification of a legitimate merchant that was impersonated by said phishing site.

7. The method of claim 1 further comprising taking protective action to provide protection from said phishing site.

8. The method of claim 7 wherein said taking protective action comprises disabling any phishing e-mail associated with said phishing site.

9. The method of claim 1 further comprising determining whether said critical values have been provided to a site.

10. The method of claim 9 wherein upon a determination that said critical values have been provided to a site, said method further comprising creating a transaction record comprising a site identifier of said site.

11. The method of claim 10 further comprising storing said transaction record.

12. The method of claim 11 wherein said transaction record is stored in a transaction record store comprising a plurality of transaction records.

13. The method of claim 12 wherein said comparing said new phishing site identifiers to site identifiers of sites to which critical values have been provided comprises determining whether any of said new phishing site identifiers match any of said site identifiers contained within said transaction records.

14. The method of claim 11 further comprising providing said transaction record to a security company.

15. The method of claim 1 wherein said site identifiers are contained within a cache of a Web browser.

16. The method of claim 1 wherein said site identifiers are contained within an e-mail.

17. A computer-program product comprising a nontransitory computer readable medium containing computer program code comprising:
   determining, during a transaction with a website, that one or more critical values were provided to the website;
   storing the one or more critical values and other transaction information in a log of transaction activities, the transaction information at least including a site identifier for each website to which one or more critical values have been provided;
   a Phishing Notification Service application for determining whether new phishing site identifiers have been created, wherein upon a determination that said new phishing site identifiers have been created, said Phishing Notification Service application further for:
   comparing said new phishing site identifiers to site identifiers of logged sites to which critical values have previously been provided, wherein upon a determination that at least one of said new phishing site identifiers matches at least one of said site identifiers, said Phishing Notification Service application further for:
   providing, using information from the log of transaction activities, a phishing notification to a user that provided the critical values to the site, the phishing notification comprising the date and/or time when the critical values were provided to the phishing site, and the actual critical values previously provided to the phishing site, the information from the log of transaction activities at least including the actual values; and
   providing a phishing notification to at least one of a merchant impersonated by the phishing site, a credit bureau, or a law enforcement agency, the phishing notification comprising the date and/or time when the critical values were provided to the phishing site.

18. A computer system comprising:
   a memory having stored therein a Phishing Notification Service application; and
   a processor coupled to said memory, wherein execution of said Phishing Notification Service application generates a method comprising:
   determining, during a transaction with a website, that one or more critical values were provided to the website;
   storing the one or more critical values and other transaction information in a log of transaction activities, the transaction information at least including a site identifier for each website to which one or more critical values have been provided;
   determining whether new phishing site identifiers have been created, wherein upon a determination that said new phishing site identifiers have been created, said method further comprising:
   comparing said new phishing site identifiers to site identifiers of logged sites to which critical values have previously been provided, wherein upon a determination that at least one of said new phishing site identifiers matches at least one of said site identifiers, said method further comprising:
   providing, using information from the log of transaction activities, a phishing notification to a user that provided the critical values to the site, the phishing notification comprising the date and/or time when the critical values were provided to the phishing site, and the actual critical values previously provided to the phishing site, the information from the log of transaction activities at least including the actual values; and
   providing a phishing notification to at least one of a merchant impersonated by the phishing site, a credit bureau, or a law enforcement agency, the phishing notification comprising the date and/or time when the critical values were provided to the phishing site.

* * * * *